United States Patent [19]

Homeier

[11] 4,291,143

[45] Sep. 22, 1981

[54] POLYMERIZATION OF UNSATURATED HYDROCARBYL HALIDE COMPOUNDS

[75] Inventor: Edwin H. Homeier, Maywood, Ill.

[73] Assignee: UOP Inc., Des Plaines, Ill.

[21] Appl. No.: 67,083

[22] Filed: Aug. 16, 1979

[51] Int. Cl.³ .............................................. C08F 4/78
[52] U.S. Cl. .................................... 526/123; 526/170; 526/291
[58] Field of Search ................................ 526/123, 170

[56] References Cited

U.S. PATENT DOCUMENTS 3,463,827  8/1969  Banks ................................. 526/170

Primary Examiner—Stanford M. Levin
Attorney, Agent, or Firm—James R. Hoatson, Jr.; Raymond H. Nelson; William H. Page, II

[57] ABSTRACT

Unsaturated hydrocarbyl halide compounds such as vinyl chloride may be polymerized by treating the compounds at a temperature in the range of from about 50° to about 200° C. and a pressure in the range of from atmospheric to about 100 atmospheres in the presence of a catalyst comprising a Group VIB metal carbonyl as exemplified by molybdenum hexacarbonyl.

10 Claims, No Drawings

POLYMERIZATION OF UNSATURATED HYDROCARBYL HALIDE COMPOUNDS

This invention relates to a process for the polymerization of unsaturated hydrocarbyl halide compounds. More specifically the invention is concerned with a process for polymerizing vinylic halides in the presence of certain catalytic compositions of matter of the type hereinafter set forth.

Polyvinylic halides will find a wide variety of uses in the chemical field. Of the polyvinlic halides, polyvinyl chloride and polyvinyl fluoride are perhaps the most widely known of this type of compound. The uses of these compounds are extremely varied. For example, polyvinyl fluoride may take various forms. When in the form of a film, it is very resistant to outdoor weather, toughness and chemical resistance, and in addition possesses the desirable characteristic of flexibility. The polyvinyl fluoride film may be used as a replacement for paint or as an outdoor protective coating on sidings, roofs, glazing, etc. Likewise, polyvinyl chloride can also take a wide variety of forms. The polyvinyl chloride resin may be converted into the desired vinyl forms by calendering, extrusion, molding, and by coating from solutions, dispersion or latexes, and by fluid bed coating. For example, when in a rubber-like final form, it may be used for electrical wire installation, sleeving, as a garden hose and other tubing, in gaskets and flexible piping. When in the form of a film, it may be used in rainwear, aprons and other garments, in curtain and draperies, upholstery, handbags, as well as being coated on fabrics to be used as automobile upholstery, clothing and wall coverings. When in rigid form, it may be used as a floor tile and for related floor coverings as well as sheets which are used as decorative panels. In addition, it may also be used for phonograph records, display items, as a pipe in chemical plants, for gas, oil and water, as well as electrical conduits due to the fact that it is resistant to corrosion, has a smooth inside surface and is light in weight. Extruded rigid shapes may be used as window frames and tracks, in luggage, book bindings, etc. In addition, polyvinyl chloride may also be in the form of foam which may be used for padding and cushions, etc. When in latex form, it may be used to coat or impregnate papers, fabric, and leather to improve resistance to abrasion, chemicals and flame.

It is therefore an object of this invention to provide a process for preparing polymeric vinylic halides.

A further object of this invention is to provide a process for polymerizing unsaturated hydrocarbyl halide compounds utilizing a Group VIB metal carbonyl catalyst.

In one aspect an embodiment of this invention resides in a process for the polymerization of an unsaturated hydrocarbyl halide compound which comprises treating said compound at polymerization conditions in the presence of a catalyst comprising a Group VIB metal carbonyl, and recovering the resultant polymer.

A specific embodiment of this invention is found in a process for the polymerization of vinyl chloride which comprises treating said vinyl chloride at a temperature in the range of from about 50° to about 200° C. and a pressure in the range of from about atmospheric to about 100 atmospheres in the presence of a promoter comprising sodium hydrogen carbonate and a catalyst comprising molybdenum hexacarbonyl, and recovering the resultant polyvinyl chloride.

Other objects and embodiments will be found in the following further detailed description of the present invention.

As hereinbefore set forth, the present invention is concerned with a process for the polymerization of unsaturated hydrocarbyl halide compounds and particularly vinylic halides. The polymerization is effected by treating the compound in the presence of a catalyst comprising a metal carbonyl in which the metal is selected from the metals of Group VIB of the Periodic Table. In addition, it so desired, the reaction is also effected in the presence of a basic compound which acts as a promoter for the polymerization reaction. The reaction conditions which are to be employed in the polymerization reaction will include temperatures in the range of from about 60° up to about 200° C. or more and pressures which may range from atmospheric up to about 100 atmospheres. The superatmospheric pressures are afforded by the introduction of a gas or a combination of gases, suitable gases which may be employed including nitrogen, helium, argon, carbon monoxide, etc.

Examples of unsaturated hydrocarbyl halide compounds which may be employed as starting materials for the polymerization reaction will include vinylic halide compounds containing from 2 to 6 carbom atoms in length. Some specific examples of these compounds will include vinyl chloride, vinyl bromide, vinyl fluoride, vinyl iodide, allyl chloride, allyl bromide, allyl fluoride, allyl iodide, the isomeric crotonyl chlorides, bromides, fluorides, iodides, the isomeric pentenyl chlorides, bromides, fluorides, iodides, the isomeric hexenyl chlorides, bromides, fluorides, iodides, etc.

Examples of catalysts comprising metal carbonyls in which the metal is selected from Group VIB of the Periodic Table will include compounds such as chromium hexacarbonyl, tungsten hexacarbonyl, molybdenum hexacarbonyl, chromium chloropentacarbonyl, tungsten chloropentacarbonyl, molybdenum chloropentacarbonyl, chromium oxytetracarbonyl, tungsten oxytetracarbonyl, molybdenum oxytetracarbonyl, cyclopentadienyl chromium dicarbonyl, cyclopentadienyl tungsten dicarbonyl, cyclopentadienyl molybdenum dicarbonyl, cycloheptatriene molybdenum tricarbonyl, dibenzenemolybdenum, ditoluenemolybdenum, cyclopentadienyl molybdenum tricarbonyl, benzenemolybdenum tricarbonyl, toluenemolybdenum tricarbonyl, xylenemolybdenum tricarbonyl, methylcyclopentadienyl molybdenum tricarbonyl dimer, triphenylphosphenylmolybdenum pentacarbonyl, tris(triphenylphosphenyl)molybdenum tricarbonyl, cycloheptatriene chromium tricarbonyl, dibenzenechromium, ditoluenechromium, cyclopentadienylchromium tricarbonyl, benzenechromium tricarbonyl, toluenechromium tricarbonyl, xylenechromium tricarbonyl, methylcyclopentadienyl chromium tricarbonyl dimer, triphenylphosphenylchromium pentacarbonyl, tris(triphenylphosphenyl)chromium tricarbonyl, cycloheptatriene tungsten tricarbonyl, dibenzenetungsten, ditoluenetungsten, cyclopentadienyl tungsten tricarbonyl, benzyltungsten tricarbonyl, toluenetungsten tricarbonyl, xylenetungsten tricarbonyl, methylcyclopentadienyl tungsten tricarbonyl dimer, triphenylphosphenyltungsten pentacarbonyl, tris(triphenylphosphenyl)tungsten tricarbonyl, etc. It is to be understood that these catalysts are only representative of the types of compounds which may be employed, and that the present invention is not necessarily limited thereto. In addition, it is also comtemplated within the scope of this invention that the reaction medium will contain a promoter compound, said compound being basic in nature. Examples of basic compounds which may be employed in the process of this invention will include alkali metal hydroxides such as sodium hydroxide, potassium hydroxide, lithium hydroxide, cesium hydroxide, rubidium hydroxide, alkali metal carbonates such as sodium carbonate, potassium carbonate, lithium carbonate, cesium carbonate, rubidium carbonate or alkali metal hydrogen carbonates such as, sodium hydrogen carbonate, potassium hydrogen carbonate, lithium hydrogen carbonate, cesium hydrogen carbonate, rubidium hydrogen carbonate, etc. If so desired, the polymerization of the vinylic halide compounds is effected in a solvent medium which will be inert to the reaction, examples of said solvents including aromatic hydrocarbons such as benzene, toluene, the xylenes, ethyl benzene, etc., paraffinic hydrocarbons such as pentane, hexane, heptane, octane, etc., cycloparaffinic compounds such as cyclopentane, cyclohexane, methyl cyclopentane, cyclohexane, etc.

The process of this invention may be effected in any suitable manner and may comprise either a batch or continuous type of operation. For example, when a batch type of operation is employed, a quantity of the vinylic halide along with the catalyst comprising a Group VIB metal carbonyl and a promoter comprising a basic compound may be placed in an appropriate apparatus along with the solvent utilized as the reaction medium. When superatmospheric pressures are to be employed, the apparatus which is used to effect the reaction will comprise a pressure resistant vessel such as an autoclave of the rotating or mixing type. The autoclave is then sealed and a gas or mixture of gases such as nitrogen and/or carbon monoxide are charged to the reactor until the desired operating pressure has been attained. Following this, the vessel and contents thereof are heated to a predetermined operating temperature within the range hereinbefore set forth and the vessel is maintained at this temperature for the duration of the reaction time which may range from about 0.5 up to about 20 hours or more. Upon reaching the completion of the reaction time, heating is discontinued and the vessel and contents thereof are allowed to return to room temperature. The excess pressure is then vented and the reaction mixture is recovered. Following recovery of the reaction mixture, it is then subjected to conventional means of separation which may include fractional distillation, crystallization, washing, drying, etc., whereby the desired polymer is separated from any unreacted starting material, catalyst solvent, base, etc., and recovered.

It is also contemplated within the scope of this invention that the process may be effected in a continuous manner of operation. When this type of operation is employed, the vinylic halide is continuously charged to a reaction vessel which is maintained at the proper operating conditions of temperature and pressure, and which also contains the Group VIB metal carbonyl catalyst. If so desired, the vinylic halide may be charged to the reactor in admixture with the solvent or, if so desired, the solvent and starting material may be charged thereto in a separate stream. In addition the basic compound which acts as a promoter for the reaction may be present in the reactor or may also be continuously charged thereto.

After passage through the reactor for a predetermined period of time, the reactor effluent is continuously withdrawn and subjected to separation means similar in nature to those hereinbefore set forth whereby the desired polymer is separated and recovered while any unreacted starting material, catalyst, solvent or base may be recycled to the reactor to act as a portion of the feed stock.

Examples of polymeric compounds which may be prepared according to the process of this invention will include polyvinyl chloride, polyvinyl bromide, polyvinyl fluoride, polyvinyl iodide, polyallyl chloride, polyallyl bromide, polyallyl fluoride, polyallyl iodide, polycrotonyl chloride, polycrotonyl bromide, polycrotonyl fluoride, polycrotonyl iodide, etc.

The following examples are given for purposes of illustrating the process of this invention. However, it is to be understood that these examples are given merely for purposes of illustration and that the present process is not necessarily limited thereto.

EXAMPLE I

In this example 2.0 grams of a catalyst comprising molybdenum hexacarbonyl, 4.1 grams of a promoter comprising sodium hydrogen carbonate, and 106 grams of vinyl chloride in 46 grams of toluene were placed in the glass liner of a stainless steel rotating autoclave. The autoclave was sealed and carbon monoxide was pressured in until an initial pressure of 10 atmospheres was reached in order to maintain the molybdenum hexacarbonyl catalyst in a stable form. The autoclave and contents thereof were then heated to a temperature of 114° C. and maintained in a range of from about 114° to 128° C. for a period of 12 hours, the pressure during this period being from 40 to 45 atmospheres. At the end of the 12 hour period, heating was discontinued and after the autoclave had reached room temperature the excess pressure was vented. The excess vinyl chloride reactant was purged from the autoclave by pressuring with nitrogen to 30 atmospheres and thereafter venting the gas. This procedure was followed for three times, following which the reaction mixture was recovered from the autoclave. The total reaction product which was recovered comprised 87 grams of which 19 grams was a liquid product and found by preparative gas liquid chromatography to consist of vinyl chloride and toluene. The remainder consisting of 68 grams of a dry polymer was in the form of a plastic film. Infrared analysis of the vacuum dried material disclosed peaks which were characteristic of toluene and polymerized vinyl chloride.

EXAMPLE II

To illustrate the necessity of the presence of both a Group VIB metal carbonyl catalyst and a base compound which acts as a promoter, a second experiment was performed in which 89 grams of vinyl chloride and 2.0 grams of molybdenum hexacarbonyl in 146 grams of toluene were placed in the glass liner of a rotating autoclave. As in the previous experiment, carbon monoxide was pressured in until an initial pressure of 10 atmospheres was reached. Thereafter the autoclave was heated to a temperature of 120° C. and maintained thereat for a period of 6 hours, the pressure during this time being about 20 atmospheres. At the end of the 6 hour period heating was discontinued and after the autoclave had returned to room temperature the excess pressure was vented. Again the excess vinyl chloride was removed by pressuring the autoclave three times with nitrogen to 30 atmospheres and venting the gas. After opening the autoclave, 265 grams of material were recovered. However, the reaction mixture comprised more than 264 grams of liquid product which was found to consist of vinyl chloride and toluene with less than 1 gram of a polymeric product.

EXAMPLE III

In this example 125 grams of vinyl chloride in 110 grams of toluene along with 14 grams of sodium hydrogen carbonate was treated in a manner similar to that set forth in the above examples. After sealing the autoclave, it was heated to a temperature of 120° C. and maintained in a range of 120° to 124° C. for a period of 12 hours, the pressure during this time being in a range of from 42 to 50 atmospheres. At the end of the 12 hour period, heating was discontinued and after the autoclave had returned to room temperature the excess pressure was vented. After treatment in a manner similar to that set forth above, 80 grams of reaction mixture was recovered. Again 79 grams of the reaction mixture was a liquid product, said product being found to comprise vinyl chloride and toluene after analysis by preparative gas liquid chromatography. Less than 1 gram of the product was in polymeric form.

I claim as my invention:

1. A process for the polymerization of an unsaturated hydrocarbyl halide compound which comprises treating said compound at a temperature in the range of from about 50° C. to about 200° C. and a pressure in the range of from about atmospheric to about 100 atmospheres in the presence of a catalyst comprising a Group VIB metal carbonyl and a promoter selected from the group consisting of an alkali metal hydroxide, an alkali metal carbonate and an alkali metal hydrogen carbonate, and recovering a polymer resultant from said polymerization.

2. The process as set forth in claim 1 in which said unsaturated hydrocarbyl halide compound contains from 2 to about 6 carbon atoms.

3. The process as set forth in claim 1 in which said alkali metal carbonate is sodium carbonate.

4. The process as set forth in claim 1 in which said alkali metal hydrogen carbonate is sodium hydrogen carbonate.

5. The process as set forth in claim 1 in which said Group VIB metal carbonyl catalyst is molybdenum hexacarbonyl.

6. The process as set forth in claim 1 in which said Group VIB metal carbonyl catalyst is tungsten chloropentacarbonyl.

7. The process as set forth in claim 1 in which said Group VIB metal carbonyl catalyst is cyclopentadienylchromium dicarbonyl.

8. The process as set forth in claim 1 in which said unsaturated hydrocarbyl halide compound is vinyl chloride and said polymer is polyvinyl chloride.

9. The process as set forth in claim 1 in which said unsaturated hydrocarbyl halide compound is propenyl chloride and said polymer is polypropenyl chloride.

10. The process as set forth in claim 1 in which said unsaturated hydrocarbyl halide compound is vinyl fluoride and said polymer is polyvinyl fluoride.

* * * * *